(12) United States Patent
Henderson (10) Patent No.: US 7,830,432 B2
(45) Date of Patent: Nov. 9, 2010

(54) IMAGE SENSOR FOR MOBILE USE AND ASSOCIATED METHODS

(75) Inventor: Robert Henderson, Edinburgh (GB)

(73) Assignee: STMicroelectronics Limited, Marlow-Buckinghamshire (GB)

( * ) Notice: Subject to any disclaimer, the term of this patent is extended or adjusted under 35 U.S.C. 154(b) by 1411 days.

(21) Appl. No.: 11/144,112

(22) Filed: Jun. 3, 2005

(65) Prior Publication Data

US 2005/0269607 A1  Dec. 8, 2005

(30) Foreign Application Priority Data

Jun. 5, 2004  (EP) .................................. 04253371

(51) Int. Cl.
*H04N 3/14* (2006.01)
(52) U.S. Cl. ..................................... 348/294
(58) Field of Classification Search ................ 348/294, 348/305, 370, 371
See application file for complete search history.

(56) References Cited

U.S. PATENT DOCUMENTS 6,140,630 A * 10/2000 Rhodes ..................... 250/208.1

| 6,667,768 | B1 * | 12/2003 | Fossum ....................... 348/308 |
| 7,106,357 | B2 * | 9/2006 | Fukuda et al. ............ 348/14.02 |
| 7,224,390 | B2 * | 5/2007 | Kokubun et al. ............. 348/308 |
| 2003/0076431 | A1 * | 4/2003 | Krymski ..................... 348/308 |
| 2004/0001056 | A1 * | 1/2004 | Atherton et al. .............. 345/212 |
| 2004/0069930 | A1 | 4/2004 | Zarnowski et al. ........... 250/208 |
| 2004/0080646 | A1 * | 4/2004 | Zhao et al. ................... 348/302 |

FOREIGN PATENT DOCUMENTS

| EP | 0 905 788 | 3/1999 |
| EP | 1 017 107 | 7/2000 |
| EP | 1 017 231 | 7/2000 |
| EP | 1 117 249 | 7/2001 |
| EP | 1 353 500 | 10/2003 |
| WO | WO98/56168 | 12/1998 |

\* cited by examiner

*Primary Examiner*—David L Ometz
*Assistant Examiner*—Akshay Trehan
(74) *Attorney, Agent, or Firm*—Lisa K. Jorgenson; Allen, Dyer, Doppelt, Milbrath & Gilchrist, P.A.

(57) ABSTRACT

The image sensor includes an array of pixels. Each pixel has a pinned photodiode which transfers charge via a transfer gate to a floating diffusion, from which output is provided by a source follower. Each column has a voltage supply line and a signal line. Each row has a transfer gate control line, a read/reset control line, and a read/reset voltage line which receives alternately zero volts and a predetermined positive voltage from a decoder circuit.

16 Claims, 8 Drawing Sheets

IMAGE SENSOR FOR MOBILE USE AND ASSOCIATED METHODS

FIELD OF THE INVENTION

The present invention relates to solid state image sensors, and is particularly useful in image sensors for use in mobile applications such as cellular phones. The invention also relates to devices, such as mobile phones, digital cameras and optical pointing devices (e.g. computer mouse) incorporating solid state image sensors.

BACKGROUND OF THE INVENTION

Image sensors using pinned photodiode pixels, typically implemented in CMOS architecture, are well known. Such image sensors in many applications have the advantage that both the image sensitive element and the image processing circuitry can be embodied in a single chip which can be manufactured using CMOS techniques.

However, there is increasing demand for image sensors for use in mobile applications such as mobile phones where power supplies are very limited. Specifically, as discussed in more detail below, many mobile devices have a battery supply at 2.4V whereas prior art pinned photodiode image sensors require a voltage of about 3V. This can be met by providing a charge pump, but at the expense of increasing the circuit complexity and cost. Moreover, the charge pump will typically require a storage capacitor which is too large to be provided on-chip, and thus an off-chip component is required.

SUMMARY OF THE INVENTION

The present invention seeks to provide an image sensor which at least addresses the above described problems.

The invention provides a solid state image sensor comprising an array of pixels arranged in rows and columns, each pixel having a photodiode connected to a floating diffusion via a transfer gate, the floating diffusion providing an output to a column output line via a source follower. Each row has a transfer gate control line. The image sensor includes at least one read/reset voltage supply line connected to the floating diffusion via a read/reset transistor. The or each read/reset voltage supply line is driven by a decoder circuit at alternately a predetermined reset voltage and a substantially lower voltage.

The invention further provides a digital camera, a mobile telephone, and a computer pointing device, each having such an image sensor.

BRIEF DESCRIPTION OF THE DRAWINGS

Embodiments of the invention will now be described, by way of example only, with reference to the drawings, in which.

DETAILED DESCRIPTION OF THE PREFERRED EMBODIMENTS

Figure 1:
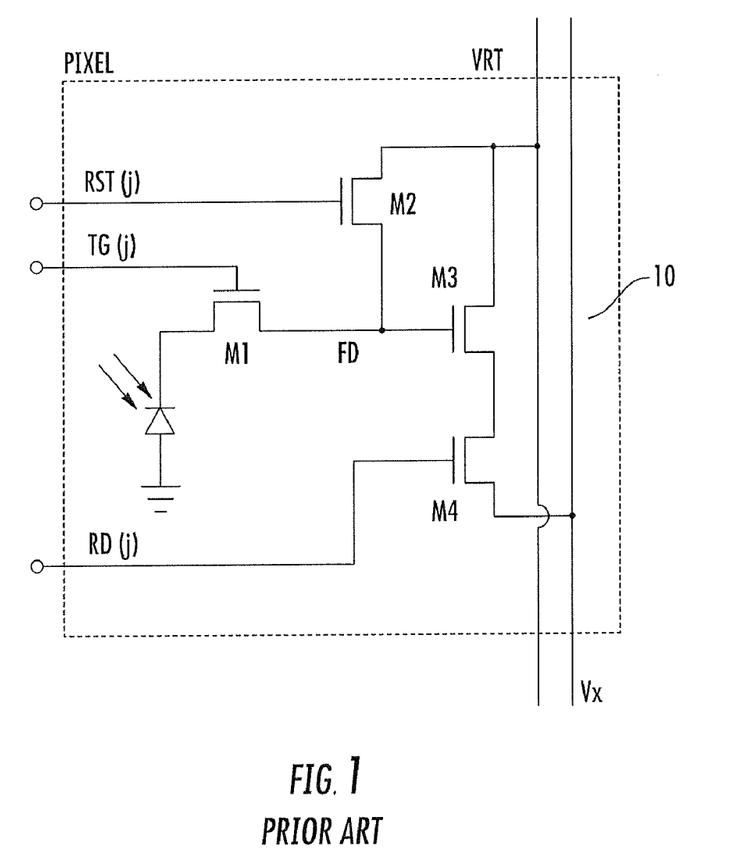
FIG. 1 is a schematic diagram of one pixel of a prior art four-transistor pinned photodiode image sensor.

Referring initially to FIG. 1, in a prior art arrangement a pixel 10 of an image array has three horizontal lines: a reset line RST(j), a transfer gate line TG(j), and a read line RD(j), and two vertical lines: a reset voltage line VRT and a signal line Vx. However, the reset potential of the floating diffusion FD is VRT, which is also the source follower supply voltage. This causes a problem that the reset potential of FD cannot be generated separately from the source follower supply voltage. In this case, VRT must supply current (typically a few mA) to bias the source followers at a sufficiently high voltage to cause complete charge transfer from the pinned photodiode without lag; typically the required voltage is around 3V. In an image sensor for mobile applications the supply voltage to the chip is often only 2.4-2.5V, and thus the 3V supply must be generated from a charge pump.

Figure 2:
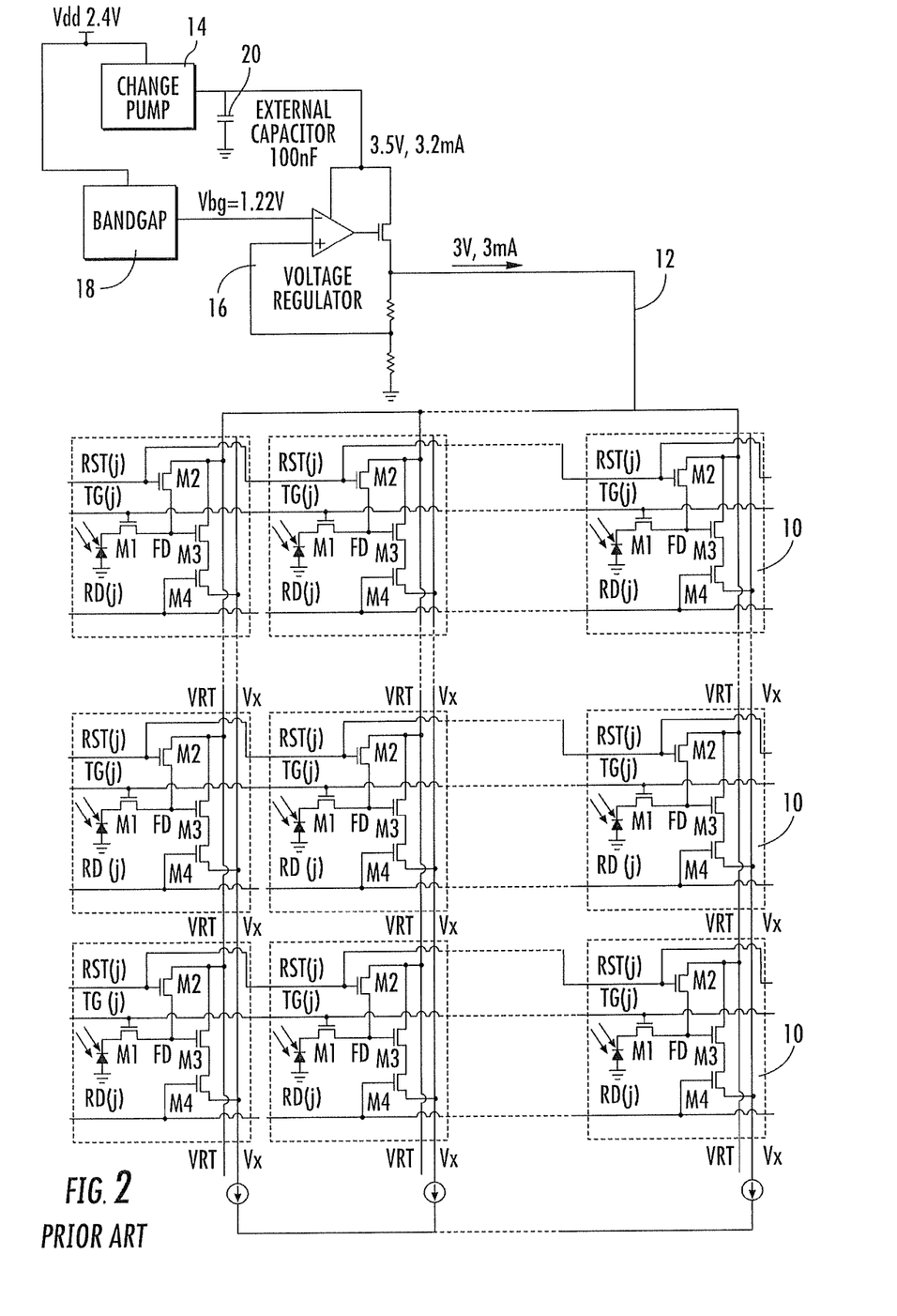
FIG. 2 is a schematic diagram showing a prior art image sensor incorporating an array of pixels as in FIG. 1, and showing the power supply arrangement.

Referring to FIG. 2 which shows a prior art circuit in greater detail, an array of pixels 10 is supplied at 3V at 12 from a battery supply Vdd of 2.4V via a charge pump 14 and a voltage regulator 16 controlled by a bandgap voltage 18. The load current required to be delivered by the charge pump 14 determines the size of the pump capacitors, clock frequency, and efficiency. Often this necessitates a storage capacitor 20 of a size which can only be provided off-chip, which increases the system physical size and cost.

Figure 3A:
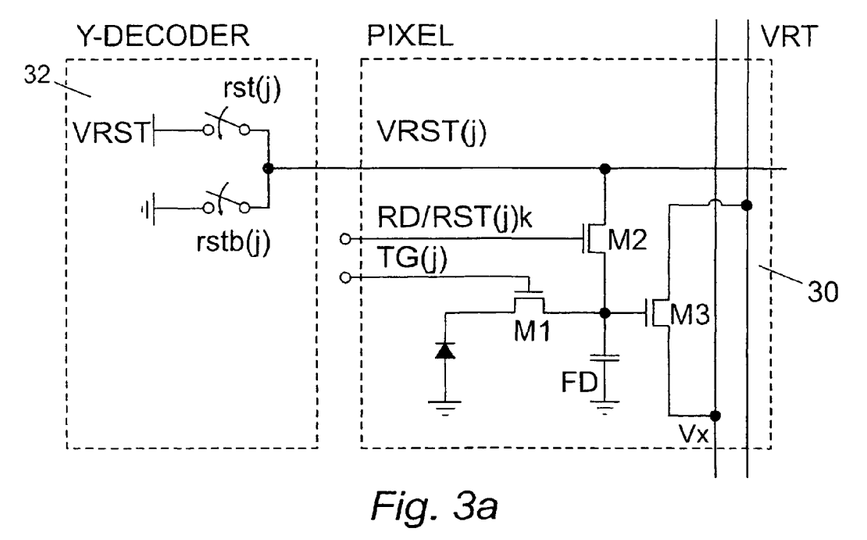
FIGS. 3a and 3b are schematic diagrams of one pixel an image sensor according to the invention.
Figure 3B:
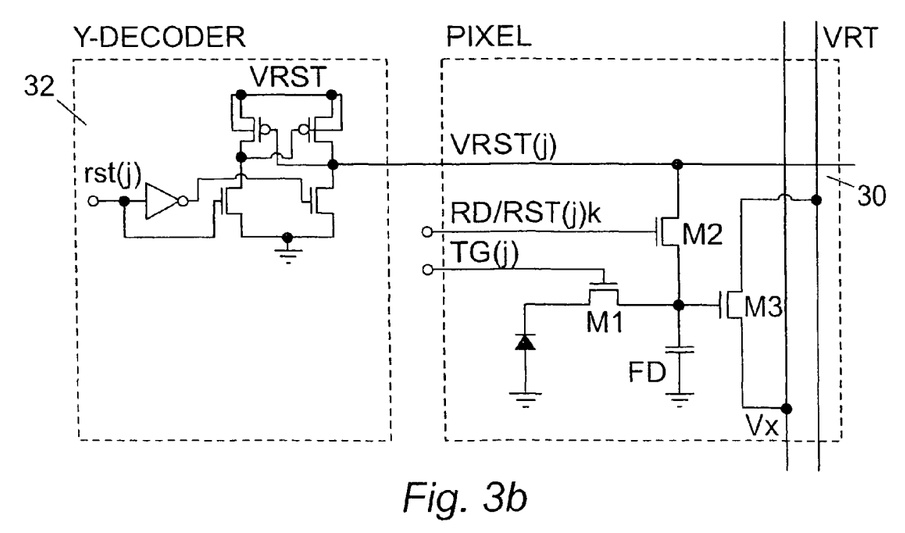

Referring to FIGS. 3a and 3b, there is shown the operating principle of a single pixel 30 in one embodiment of the present invention. The pixel 30 operates as a pinned photodiode pixel using three transistors M1-M3, the floating diffusion being shown as a capacitor FD. The pixel 30 has vertical VRT and Vx lines, and horizontal read reset line RD/RST(j)k and transfer gate line TG(j). The floating diffusion FD is reset to the voltage on a further horizontal line VRST(j). This voltage is time multiplexed between VRST and a much lower voltage (from zero to a few hundred mV above ground) by a Y-decoder circuit 32. FIG. 3a illustratively shows the Y-decoder circuit 32 as an analog multiplexer. FIG. 3b illustratively shows the circuit 32 in the form of a level shifter.

Figure 4:
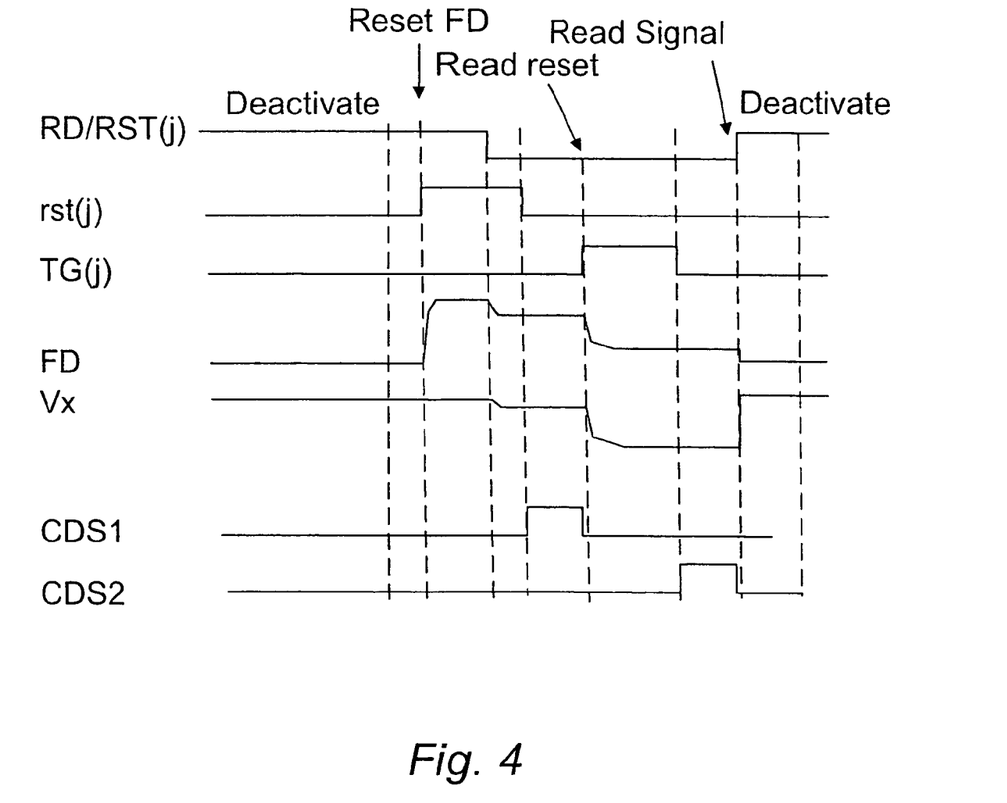
FIG. 4 is a timing diagram showing timing in the pixel of FIG. 3.

The timing of the pixel 30 is illustrated in FIG. 4. To deactivate the pixel in row j the sensing node FD is set at 0V (or other low voltage) when the pixel is not being read, switching the source follower transistor M3 off. This is done by RD/RST(j)=0 and VRST(j)=0, rstb(j)=hi, which will set VRST(j)=0V. The transistor M2 conducts the FD to VRST(j) =0V, maintaining the source follower transistor M3 in the off state. RD/RST(j) and rst(j) are maintained in these states by the Y-decoder 32 for all rows of pixels (j) which are not being read.

To read out a row of pixels, rst(j) is asserted setting VRST (j)=VRST. Since RD/RST(j) is normally still asserted (pixel is not being read beforehand) the FD is set to VRST by M2. The high voltage on the gate of M3 causes current to flow producing a voltage Vx which is Vt below the voltage on M3. All other M3 in pixels on the same column have a gate voltage of 0V and so are not conducting.

The reset and signal voltages from the pixel are sampled by signals CDS1 and CDS2 at the base of the column. The RD/RST(j) line falls to 0V causing charge injection and reset coupling to produce a small decrease in the voltage on FD.

The voltage on Vx follows this change and is sampled by CDS1 on a column capacitor. This sample is the black reference sample from the pixel.

The signal sample from the pixel is produced by pulsing TG(j) low then high to transfer charge from the pinned photodiode to the floating diffusion FD. This produces a variable downwards voltage swing on FD proportional to the amount of light charge integrated on the photodiode. The column voltage Vx follows the change in FD and is sampled by CDS2 onto a second column sampling capacitor. The sampled voltages are subtracted to remove kT/C noise introduced when releasing FD from reset.

Figure 5A:
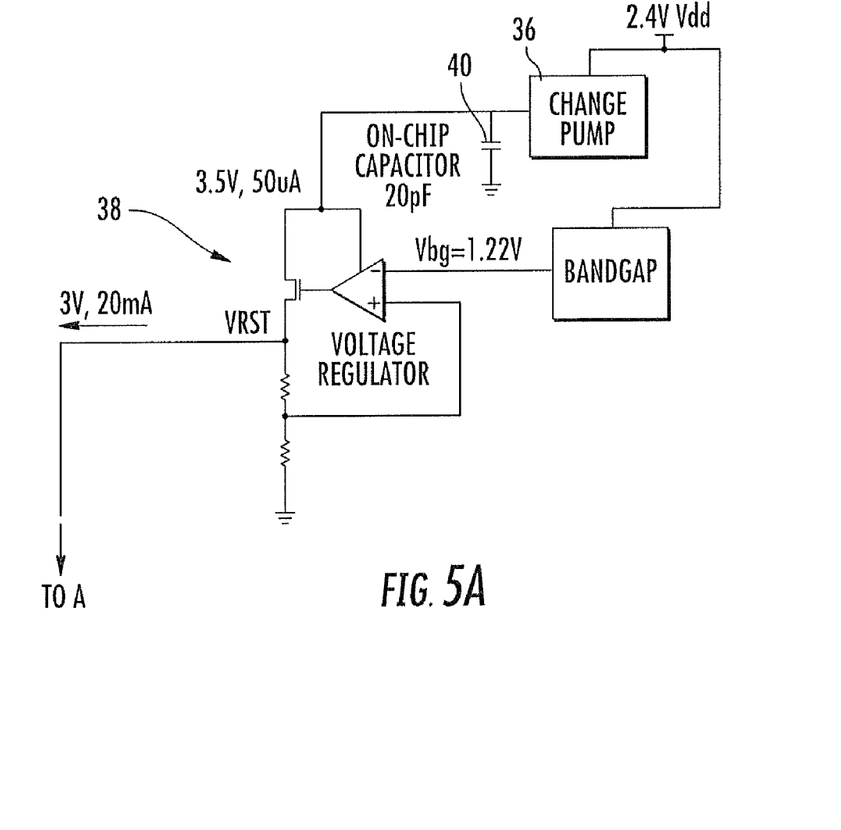
FIGS. 5a-5c are schematic diagrams showing an image sensor incorporating an array of pixels as in FIG. 3.
Figure 5B:
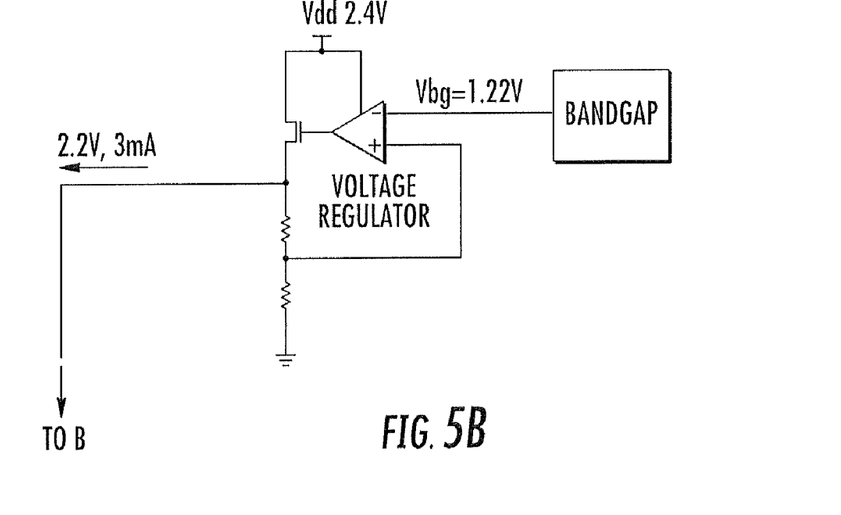
Figure 5C:
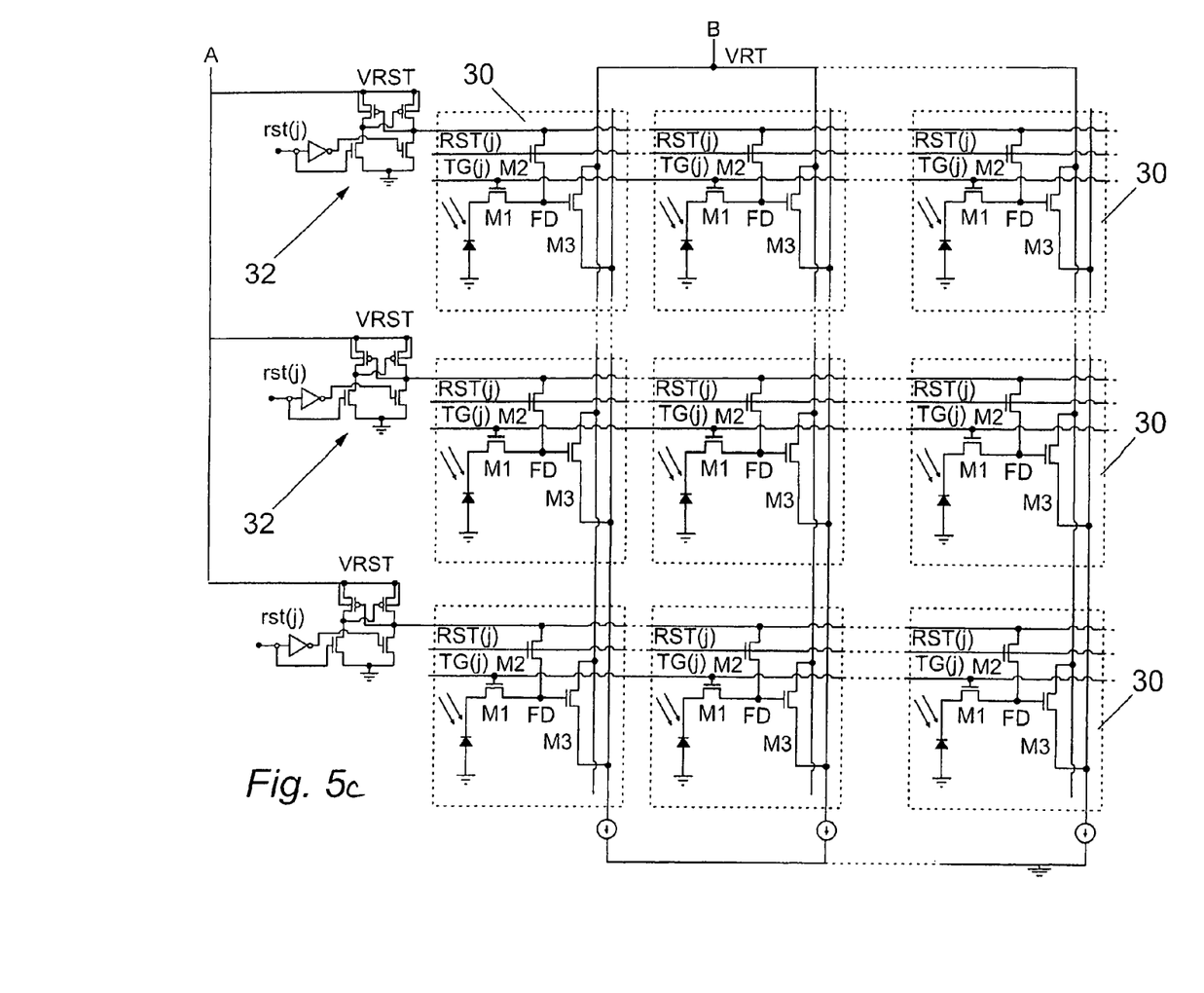

It is noted that the pixel in FIG. 3 can be realized with three horizontal lines (RD/RST(j), VRST(j), and TG(j)) and two vertical lines (VRT and Vx). Using this three transistor pixel with horizontal VRST allows the constraints on VRT and VRST to be separated. Referring to FIGS. 5a-5c, VRT can be supplied directly by an input battery voltage AVDD=2.5V via a voltage regulator 34. VRST still has to be typically 3V which can be produced by a charge pump 36 supplying a voltage regulator 38.

The load on VRST is purely capacitive. A row of FD capacitances must be charged on the readout of each video line; this typically amounts to 3 pF every 50 µs. No DC current is involved. This makes it possible to use a charge pump with on-chip components of reasonable size, typically with a storage capacitor of about 20 µF which can readily be provided on-chip.

Figure 6:
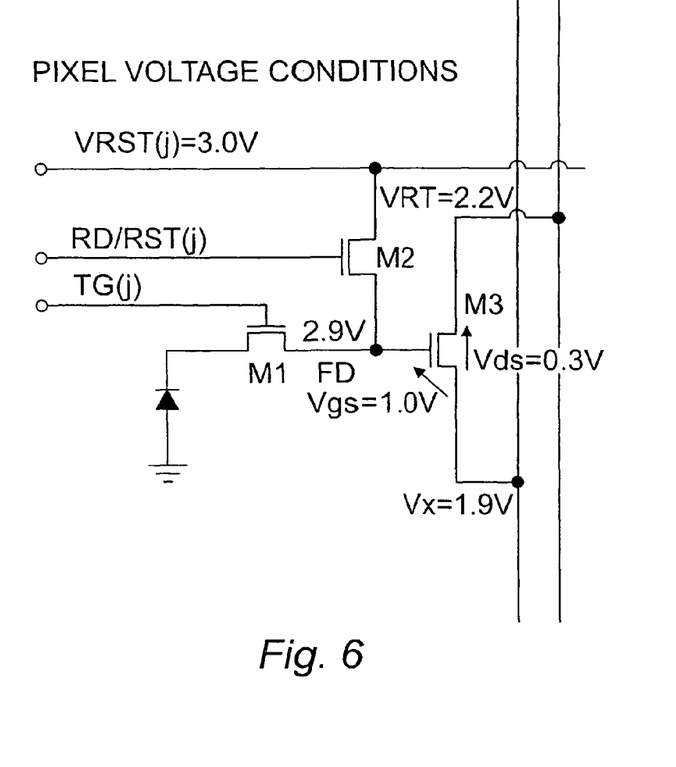
FIG. 6 is a schematic diagram showing voltage conditions in the pixel of FIG. 3 after reset and during readout.

FIG. 6 illustrates the voltage conditions on M3 during and after reset. The bias conditions on M3 make it possible for the drain voltage to be lower than the gate voltage provided the Vgs drop of M3 is sufficiently large. Since body effect has a significant effect, the Vgs drop is around 1V.

Figure 7:
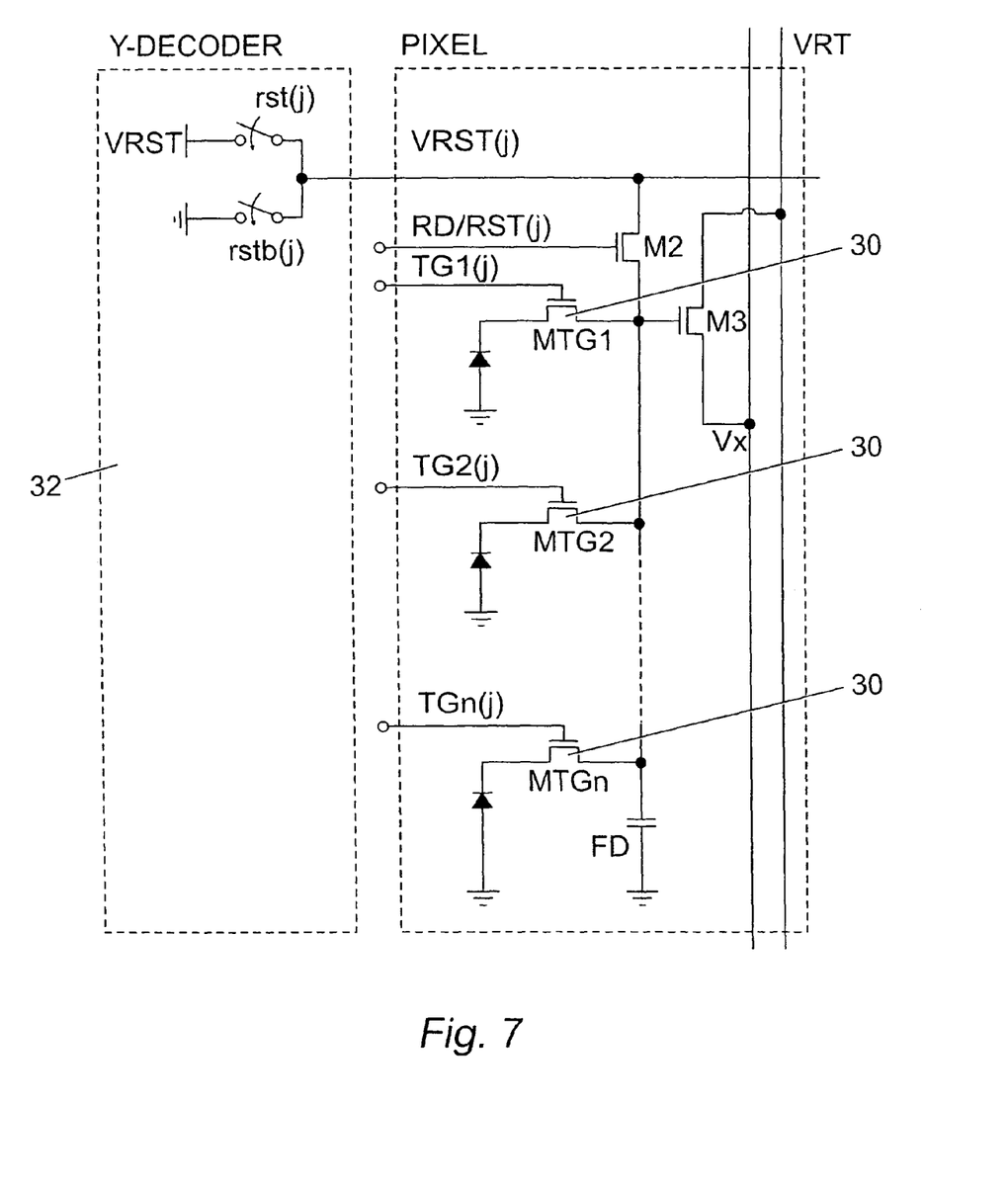
FIG. 7 is a schematic diagram illustrating an alternative embodiment.

FIG. 7 shows an alternative embodiment, in which a number n of photodiode sites are coupled to a single floating diffusion FD and share source follower and reset transistors M3 and M2. The technique of sharing transistors is effective in reducing the proportion of non-photosensitive circuitry area to photodiode area for maximum light gathering capacity and minimum pixel size.

The invention thus makes it possible to dispense with off-chip storage elements. Further, the invention allows a pinned-photodiode arrangement which requires only three (or fewer) transistors per pixel. It will be appreciated that the solid state image sensor of the invention can be incorporated in a number of devices.

As one example, the sensor may form part of a digital camera in which a camera lens focuses a desired image onto the image plane of the image sensor. In another use, the image sensor may be incorporated in a mobile phone having the customary receiving and transmitting means for digital signals. A further use is in an optical mouse, or pointing device, for use with a computer. The optical mouse has a housing which provides a button surface and which contains an illumination source, a lens, and a solid state image sensor. The lens provides optical transmission of highlights, produced by the illumination source on a mouse mat or equivalent to the image sensor.

The invention is particularly suited to such applications, where efficient power supply arrangements are desirable to minimize current draw and battery size, and to prolong battery life.

That which is claimed:

1. A solid state image sensor comprising:
   a plurality of column output lines;
   an array of pixels arranged in rows and columns, each pixel comprising
       a transfer gate,
       a floating diffusion,
       a source follower, and
       a photodiode connected to the floating diffusion via the transfer gate, the floating diffusion providing an output to a column output line via the source follower;
   each row of pixels including a transfer gate control line;
   at least one read/reset transistor;
   at least one read/reset voltage supply line connected to the floating diffusion via the source of the read/reset transistor;
   a source follower voltage supply line, distinct from the at least one read/reset voltage supply line; and for providing a source follower supply voltage, and
   a decoder circuit alternately driving the at least one read/reset voltage supply line at a predetermined reset voltage and a substantially lower voltage.

2. A solid state image sensor according to claim 1, wherein the substantially lower voltage is between zero and a few hundred millivolts above a reference voltage.

3. A solid state image sensor according to claim 1, wherein each pixel includes a read/reset transistor and each row has a read/reset voltage supply line.

4. A solid state image sensor according to claim 1, wherein a plurality of pixels in a column share a common floating diffusion, an associated common read/reset transistor, and a common read/reset voltage supply line.

5. An image sensor according to claim 1, wherein said decoder circuit comprises an analog multiplexer.

6. An image sensor according to claim 1, wherein each column line is connected alternately to a black level buffer and a signal level buffer synchronously with the read/reset voltages, and the stored values are used to cancel reset (kT/C) noise.

7. An image sensor according to claim 6, wherein said buffers comprise column capacitors.

8. An image sensor according to claim 1, further comprising a power supply circuit for supplying the decoding circuit with the predetermined reset voltage, the power supply circuit including a charge pump circuit and associated on-chip storage capacitors.

9. An image sensor according to claim 8, wherein the charge pump circuit includes an on-chip storage capacitor having about 20 µF capacitance.

10. An image sensor according to claim 8, further comprising a second power supply circuit for supplying power to a remainder of the image sensor at a lower voltage than that of the charge pump.

11. A method of operating a solid state image sensor comprising a plurality of column output lines, an array of pixels arranged in rows and columns, each pixel including a transfer gate, a floating diffusion, a source follower, and a photodiode connected to the floating diffusion via the transfer gate, the floating diffusion providing an output to a column output line via the source follower, each row of pixels including a transfer gate control line, the sensor further comprising at least one read/reset transistor, at least one read/reset voltage supply line connected to the floating diffusion via the source of the read/reset transistor, and a source follower voltage supply line, distinct from the at least one read/reset voltage supply line, and for providing a source follower supply voltage, the method comprising:
   alternately driving the at least one read/reset voltage supply line at a predetermined reset voltage and a substantially lower voltage.

12. A method according to claim 11, wherein an analog multiplexer drives the at least one read/reset voltage supply line.

13. An electronic device comprising:
a solid state image sensor including
an array of pixels arranged in rows and columns, each pixel comprising
a transfer gate,
a floating diffusion,
a source follower, and
a photodiode connected to the floating diffusion via the transfer gate, the floating diffusion providing an output to a column output line via the source follower,
each row of pixels including a transfer gate control line,
at least one read/reset transistor,
at least one read/reset voltage supply line connected to the floating diffusion via the source of the read/reset transistor,
a source follower voltage supply line, distinct from the at least one read/reset voltage supply line, and for providing a source follower supply voltage, and
a decoder circuit alternately driving the at least one read/reset voltage supply line at a predetermined reset voltage and a substantially lower voltage.

14. An electronic device according to claim 13 wherein the device comprises a digital camera.

15. An electronic device according to claim 13 further comprising a receiving and transmitter for digital data; the receiver, transmitter and image sensor defining a mobile telephone.

16. An electronic device according to claim 13 further comprising a housing having a button surface, a source of illumination mounted within the housing, and the solid state image sensor mounted within the housing and optically coupled by a lens to highlights originating from the illumination source; the housing, illumination source, lens and image sensor defining a computer system pointing device.

* * * * *

UNITED STATES PATENT AND TRADEMARK OFFICE
CERTIFICATE OF CORRECTION

| | | |
|---|---|---|
| PATENT NO. | : 7,830,432 B2 | |
| APPLICATION NO. | : 11/144112 | |
| DATED | : November 9, 2010 | |
| INVENTOR(S) | : Henderson | |

It is certified that error appears in the above-identified patent and that said Letters Patent is hereby corrected as shown below:

Column 3, Line 27      Delete "capacitor of"
                       Insert: --capacitor 40 of--

Column 6, Line 10      Delete "receiving"
                       Insert: --receiver--

Signed and Sealed this
Twenty-eighth Day of June, 2011

David J. Kappos
*Director of the United States Patent and Trademark Office*